United States Patent [19]

Portas et al.

[11] 3,965,615

[45] June 29, 1976

[54] METHOD OF PREVENTING THE FORMATION OF FROST

[76] Inventors: Abelardo Antonio Portas; Martin Pinto, both of Chivilcoy 140, Buenos Aires, Argentina

[22] Filed: Sept. 30, 1974

[21] Appl. No.: 510,581

[30] Foreign Application Priority Data
Oct. 16, 1973 Argentina ............................ 250541

[52] U.S. Cl. .................................... 47/2; 252/305; 252/359 R
[51] Int. Cl.² ...................... A01G 13/00; C09K 3/30
[58] Field of Search ................... 252/305, 359; 47/2

[56] References Cited
UNITED STATES PATENTS

| | | | |
|---|---|---|---|
| 1,303,749 | 5/1919 | Wilkinson | 252/305 UX |
| 1,358,084 | 11/1920 | Leigh | 252/305 |
| 1,433,732 | 10/1922 | Wilson et al. | 252/305 |
| 2,432,372 | 12/1947 | Besler | 252/359 |
| 2,451,019 | 10/1948 | Davis | 252/359 |
| 3,584,412 | 6/1971 | Palmer | 47/2 |
| 3,654,175 | 4/1972 | Henderson | 252/305 |
| 3,736,261 | 5/1973 | Bjornerud et al. | 252/305 |

FOREIGN PATENTS OR APPLICATIONS

| | | | |
|---|---|---|---|
| 1,064,259 | 5/1954 | France | 47/2 |
| 1,176,072 | 4/1959 | France | 47/2 |

*Primary Examiner*—Robert E. Bagwill
*Attorney, Agent, or Firm*—Joseph P. Gastel

[57] ABSTRACT

A method for producing a fog to extract freezable moisture from plants and to increase the ambient humidity and temperature surrounding plants comprising the steps of providing a mixture of silicon tetrachloride and an emulsifier in the proportion of between about 20% to 90% of silicon tetrachloride and between about 80% and 10% of emulsifier, combining the silicon tetrachloride-emulsifier mixture with an aqueous ammonia solution containing between 28% and 33% of ammonia in an amount of between about 1 part of the silicon tetrachloride-emulsifier solution to between about 2.5 and 3 parts of the ammonia solution to produce a fog containing ammonium chloride which removes moisture from the plants and increases the ambient humidity surrounding the plants to thereby raise the ambient temperature.

18 Claims, No Drawings

METHOD OF PREVENTING THE FORMATION OF FROST

The present invention refers to a method for forming an artificial haze or clouds, capable of increasing the humidity and/or surrounding temperature and intended to neutralize or offset the hurtful effects of the frosts, specially during spring, when the plants are in bloom. During the quiet serene nights, due to the loss of sun warmth, the temperature drops rapidly and results in the freezing of the sap in the plants with the corresponding increase of its volume, and the consequent destruction of the cellular tissues of the plants, which can be partial or sometimes total.

The methods available to combat the frosts, are generally based on the use of different types of heaters, conveniently located at some regular distances on the ground, which heat and dry the air. However, these methods have the important disadvantage of producing ascendent air flows, substituted by very dry descendent flows of low temperature, thus instead of improving the air conditions, they make them worse — increasing the frost magnitude on the ground surface.

Another system used for the above purpose, is the irrigation by aspersion, intended to increase rapidly the humidity of the surrounding air, but this method has the great inconvenience of sweeping the pollen from the flowers, thus preventing the process of pollinization.

There is another method that can be used to impede the rapid radiation of the soil, which consists in producing clouds of an intense smoke, thus disminishing the air transparence, but its instability and difficulties for achieving a correct dispersion, make it almost impossible to obtain satisfactory results.

Therefore effects were made to obtain a method without the above inconveniences to efficiently solve the above problem.

As a result of numerous experiments and testings, the desired solution was obtained by means of an artificial haze or clouds, produced by the procedure, which is the subject matter of the present invention.

In accordance with the specified characteristics of the above haze or clouds, it its possible to counteract the effects of the frosts, because the system permits to the raising of the ambient temperature or maintaining it at 0°C or above 0°C, or preventing the drop of the temperature and attaining some combined effects to obviate the natural conditions which produce frosts — thus avoiding harm and destruction caused by same.

According to the idea of the invention, the method consists in a pulverization or atomization by means of an air flow, produced by a turbofan, from one nozzle of a mixture of silicon tetrachloride and one or more emulsifiers such as gasoil, mineral oil, vegetable oil, paraffins, resins, glycerin, animal fats, glycol, kerosene, dieseloil, petrol, etc. and simultaneously from another nozzle the water and ammonia, i.e. ammonium hidroxide. This procedure permits the formation of different simple mixtures, in which always is included silicon tetrachloride in proportions that can vary between 20% and 90% and also emulsifiers in a convenient proportion for helping the handling of the fog formation, which can vary between 80% and 10%.

The amount of ammonium hydroxide added can also be variable but always in relation with the amount of tetrachloride for producing the ammonium chloride, which is the main product for absorbing the plant humidity. The intensity of the white color of the artificial cloud formed, depends on whether a greater or smaller proportion of ammonia is added. In apparatus which was used for producing the fog, a mixture of silicon tetrachloride and an emulsifier, in the proportions listed above, was expelled from a first nozzle by gravity and the water-ammonia mixture was expelled from a second nozzle also by gravity.

Both substances are combined and then forced into the atmosphere by turbofans adjacent to the nozzles. The nozzles were positioned immediately adjacent each other so that the streams emanating therefrom collided to produce intimate mixing of the two streams. The flow through the first nozzle was at a rate of 1 liter per minute and the flow through the second nozzle was at a rate of 3 liters per minute. It will be appreciated that any suitable flow rates and pressure may be used, and that the foregoing values are merely by way of example and not limitation. It will also be appreciated that any other suitable apparatus can be used to generate the fog of the present type which absorbs moisture from the plants and thus avoids the rupture of the cell membranes due to freezing of such moisture. Said pulverization or atomization leads to the production of a continuous reaction, which basically can be formulated as follows:

$$SiCl_4 + 4 NH_3 + 2 H_2O \rightarrow SiO_2 + 4 NH_4Cl$$

The artificial clouds or fog have the property of providing this continuous reaction during a long time and have an affinity for oxygen and humidity and easily penetrate among the foliages of the plants, covering all the space between the ground surface and the treetops or planttops. The relative ambient humidity is produced in part by water which is removed from the plants. This water therefore cannot freeze while in the plant membranes, thereby avoiding rupturing of such membranes.

The humid cloud, in virtue of the development of the above chemical reaction, raises the ambient humidity to the degrees higher than 80%, reaching often 100%. Furthermore, said reaction raises the ambient temperature or at least maintains it, not admitting any sensible drop. In these conditions, maintaining a high humidity percentage and avoiding the drop of the temperature, the loss of the ground warmth, i.e. the soil radiation is prevented and consequently the production of the frosts becomes impossible.

The silicone tetrachloride with the addition of some emulsifiers forms a stable and homogeneous mixture, which, as it was already said, is atomized by means of a strong air flow, together with the ammonium hydroxide, in the approximate proportion of a liter of the mixture formed by silicon tetrachloride and emulsifiers and two liters of three liters of the ammonium hydroxide of a preferred concentration of more or less 28% in weight of the ammonia ($NH_3$). In an equivalent proportion, this ammonium hydroxide can be used in weaker solutions, but under these circumstances the flow through the ammonia nozzle should be adjusted. It can be also replaced by water and gas ammonia ($NH_3$). But always indispensably with water-not alone. The achieved experiments have shown that various components can be used in the ratio of between about 20% to 90% by weight of silicon tetrachloride relative to the emulsifier, and between about 80% to 10% by weight of the emulsifier relative to the silicon tetrachloride and between 2.5 parts by volume to 3 parts by volume of the ammonia solution having a concentration of between 28% and 33%. A more preferable range would be between 20% and 45 percent by weight of the silicon tetrachloride relative to the emulsifier and between 80% and 55% by weight of the emulsifier relative to the silicone tetrachloride, and between 2.5 and 3 parts by volume, as a maximum, of the ammonia relative to one part by volume of the silicon tetrachloride emulsion. The most preferable range mixture would be about 33% of silicon tetrachloride and 67% of emulsifiers by weight relative to each other with the silicon tetrachloride-emulsifier being in the ratio of one part by volume to 2.5 – 3 parts by volume of aqueous ammonia solution having a concentration of 28%.

During the above mentioned experiments it was verified that the great capacity of expansion of the artificial clouds in question, produced with one liter of the mixture of tetrachloride and emulsifiers and with the addition of two and half liters of the ammonium hydroxide, atomized in one minute, covers approximately four hectars, with a rapid initiation of the chemical reaction and natural expansion, raising the ambient temperature from −4°C to 0°C or 0.5°C or maintaining the temperature at 0°C, depending on the original conditions, and increasing the humidity to 97%. The raise of the temperature and humidity is gradual and takes from a quarter of an hour to half an hour, but the conditions of the activity are maintained, even when the white colour of the ammonium chloride dissipates. It is obvious that in the exposed method some changes in its details can be introduced, but naturally without turning away from the scope of the present invention, which is clearly determined in the following claims.

We claim:

1. A method for producing a fog to absorb moisture from plants and increase the ambient humidity surrounding the plants to prevent frost damage comprising the steps of providing in relatively sufficient amounts, silicon tetrachloride, an emulsifier, and ammonia, and forcibly combining said silicon tetrachloride, emulsifier and ammonia, said silicon tetrachloride and said ammonia and said emulsifier combining to form an atmospheric fog containing ammonium chloride and silicone dioxide and emulsifier to absorb moisture from plants and raise the ambient humidity surrounding the plants, to thereby aid in avoiding the rupture of the cells of said plants as a result of the freezing of said moisture in said cells.

2. A method as set forth in claim 1 wherein said silicon tetrachloride, emulsifier, and ammonia are combined by forcibly mixing them after expelling them from nozzles into the atmosphere.

3. A method as set forth in claim 2 wherein said ammonia is in the form of an aqueous ammonia solution.

4. A method as set forth in claim 1 wherein said silicon tetrachloride and said emulsifier are premixed for ejection from a first nozzle and wherein said ammonia is ejected from a second nozzle.

5. A method as set forth in claim 4 wherein said forcible combining is effected by a turbofan.

6. A method as set forth in claim 4 wherein said ammonia is in the form of an aqueous ammonia solution.

7. A method as set forth in claim 1 wherein said silicon tetrachloride relative to said emulsifier is present in an amount of between about 20% to 90% by weight and wherein said emulsifier relative to said silicon tetrachloride is present in an amount of between about 80% and 10% by weight.

8. A method as set forth in claim 7 wherein said ammonia is in the form of an aqueous ammonia solution and is combined with said silicon tetrachloride-emulsion in an amount of about one part by volume of silicon tetrachloride-emulsion and between about 2½ and 3 parts by volume of aqueous ammonia solution and wherein said ammonia is of a concentration of between about 28% and 33% by weight.

9. A method as set forth in claim 7 wherein said ammonia is in the form of an aqueous ammonia solution.

10. A method as set forth in claim 1 wherein said silicon tetrachloride is present relative to said emulsion in an amount of about 33% by weight and said emulsifier is present relative to said silicon tetrachloride in an amount of about 67% by weight.

11. A method as set forth in claim 10 wherein said ammonia is in the form of an aqueous solution and is combined with said silicon tetrachloride-emulsion in an amount of between about one part silicon tetrachloride-emulsion by volume to 2–3 parts of aqueous ammonia of a concentration of 28% by weight.

12. A method as set forth in claim 10 wherein said ammonia is in the form of an aqueous ammonia solution.

13. A method as set forth in claim 1 wherein said ammonia is in the form of an aqueous ammonia solution.

14. A method as set forth in claim 13 wherein said aqueous ammonia solution contains between about 25% and 30% of ammonia by weight.

15. A method as set forth in claim 1 wherein said ammonia is in the form of a gas.

16. A method as set forth in claim 1 wherein said forcible combining is effected by a turbofan.

17. A method as set forth in claim 1 wherein said silicon tetrachloride is present relative to said emulsion in an amount of between about 20% and 45% by weight and wherein said emulsifier relative to said silicon tetrachloride is present in an amount of between 80% and 55% by weight.

18. A method as set forth in claim 17 wherein said ammonia is in the form of an aqueous ammonia solution.

* * * * *